Nov. 3, 1942.    S. B. CRARY    2,300,873
INDUCTION MOTOR DRIVE
Filed Dec. 6, 1941
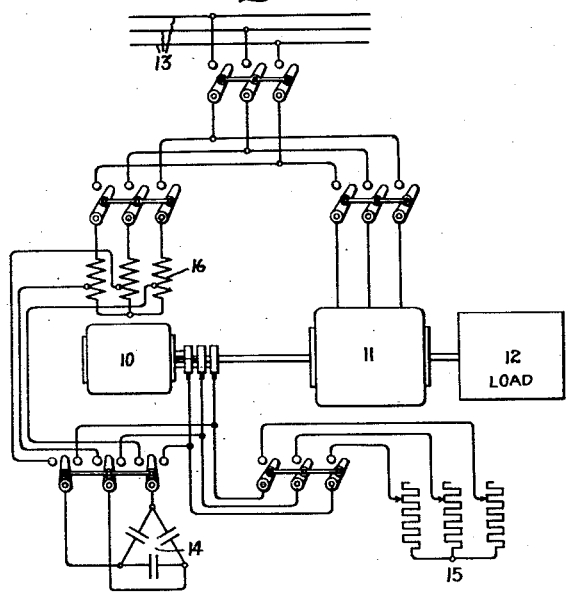
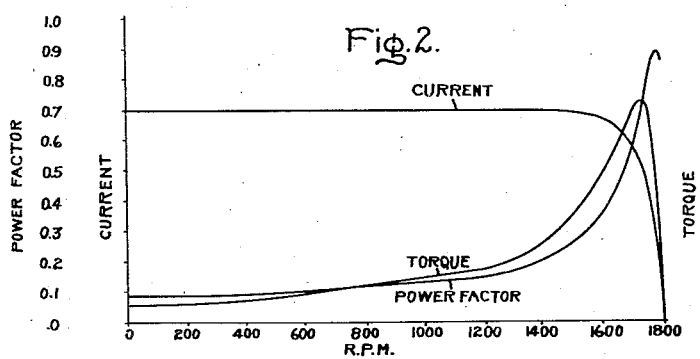
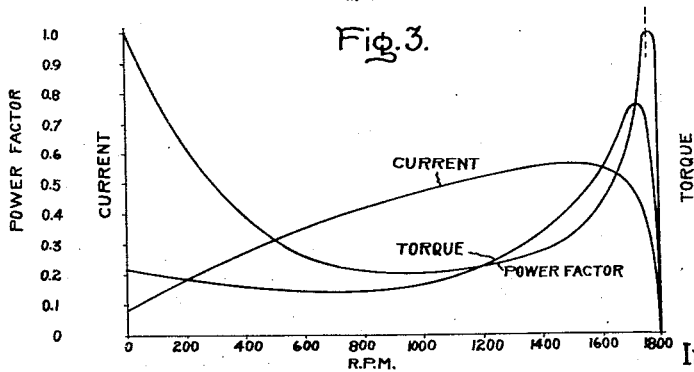
Inventor:
Selden B. Crary,
by Harry E. Dunham
His Attorney.

Patented Nov. 3, 1942

2,300,873

UNITED STATES PATENT OFFICE 2,300,873

INDUCTION MOTOR DRIVE

Selden B. Crary, Schenectady, N. Y., assignor to General Electric Company, a corporation of New York Application December 6, 1941, Serial No. 421,938

6 Claims. (Cl. 172—274)

My invention relates to induction motor drives in which two induction motors producing different characteristics are combined to obtain improved over-all characteristics. The most important objects of my invention are to obtain an improvement in power factor during the starting of induction motors and a reduction in starting current.

In carrying my invention into effect I provide one of the two induction motors with capacitance in its secondary circuit. During the starting period such motor then serves as a variable transformer between the source of supply and capacitance. This improves the power factor and reduces the starting current of the combination. The corrective kva. furnished by the capacitance is automatically reduced as the motor increases in speed. The motor having capacitance in its secondary may be of a lower pole number than the other motor or may be otherwise arranged as by gearing to have considerable slip at the normal operating speed of the combination in order that some of the power factor correcting effect of its capacitance will be available at operating speed. Other desirable features of the invention will be explained.

Those features of my invention which are believed to be novel and patentable will be pointed out in the claims appended hereto. For a better understanding of my invention reference is made in the following description to the accompanying drawing in which Fig. 1 represents an induction motor drive combination embodying my invention; Fig. 2 shows by way of curves of current, power factor and torque plotted against speed, the usual characteristics of a squirrel cage induction motor; and Fig. 3 shows by corresponding curves the improvement in starting characteristics afforded by my invention.

Referring now to Fig. 1, 10 and 11 are a pair of induction motors connected to drive a load represented at 12. The motors are to have their primary windings supplied from a common source of supply 13. The motor 11 may be either of the squirrel cage or wound secondary type. The motor 10 is of the wound secondary type, the secondary leads being brought out through slip rings for connection to capacitance 14.

With the capacitance connected in the secondary of motor 10 it will be apparent that if the motors are started by being simultaneously connected to the supply lines 13 the motor 11 will draw power at a lagging power factor but that motor 10 because of ample capacitance in its secondary will draw power at a leading power factor. Hence, at starting the resultant power factor of the combination will be considerably better than that of a single standard motor drawing an equivalent amount of power during its starting operation and for the same reason the starting current of the two motor combination will be lower than for a single motor of equivalent starting capacity. The extent of such improvement at the instant of starting for the two motor combination can be made sufficient for complete power factor correction and is present whether the motors be of the same or different pole numbers.

As motor 10 comes up to speed it acts as a variable frequency variable voltage transformer and the frequency and voltage of its secondary decreases and hence the capacitance becomes less and less effective as the speed increases. Hence it is unnecessary to make the capacitance adjustable. Also, the torque of motor 10 falls off rapidly as it approaches zero slip speed, since as zero slip is approached the secondary of motor 10 approaches an open circuit condition assuming that only capacitance is connected in its secondary.

In order to obtain the benefit of the power factor correction of the capacitance 14 up to and including normal running speed of the combination it may be desirable that at normal running speed of the combination, motor 10 shall operate at high slip. This may be accomplished either by making its pole number less than that of motor 11 or by gearing between them. If, for example, motor 10 be a two pole motor and motor 11 a four pole motor and they are directly mechanically connected as represented, motor 10 will operate at nearly 50 per cent slip when motor 11 approaches synchronous speed. Under these conditions, motor 10 will contribute power factor correction and some torque to the combination under normal speed operating conditions which will be or can be made approximately that of the normal operating speed of motor 11.

The power factor correction and torque of motor 10 at normal operating speed may be increased by making motor 10 two poles and motor 11 six poles, or decreased by making motor 10 four poles and motor 11 six poles, etc. As motor 10 comes up to the operating speed from a starting condition the power factor correction afforded thereby decreases and we obtain in effect an automatic decrease in capacitance. Actually the capacitance remains the same but its effect is decreased because of the decrease in voltage and frequency across it. This is a desirable condition because less power factor correction is needed as the speed of an induction motor increases. As is well known, condensers will stand a considerable over-voltage for a short period of time. Hence, condensers designed primarily for the normal running conditions will suffice and be utilized at good efficiency both during starting and during normal operation.

In Fig. 2 I have shown calculated current torque and power factor curves of a four pole squirrel cage induction motor and in Fig. 3 the corresponding curves on the same scale for the combination of my invention where the motor 11 is assumed to be the same motor as for the curves of Fig. 2 and the motor 10 a two pole motor of one-half the rating of motor 11 with sufficient capacity in its secondary to obtain unity power factor for the combination at start. It is also assumed in both cases that the motors are started at full line voltage. The very substantial improvement in the starting conditions obtained by my invention is apparent from a comparison of the curves of Figs. 2 and 3. It will also be noted that the power factor at the usual normal operating speed for my combination is close to unity and passes from lagging to leading as synchronous speed is approached, whereas the power factor of the single motor, Fig. 2, for normal operating speed is below .90 and is lagging.

After the starting operation the motors may be operated or used in various ways to suit requirements. Either motor may be operated alone or both may be operated together. When motor 10 is operating it may have the capacitance connected in its secondary or it may have a control resistance 15 connected in its secondary or it may have both connected.

If power factor correction at the running speed is desired and such correction is to be obtained as previously described, motor 10 should operate at high slip and capacitance 14 should be included in its secondary and the motor 11 used at low slip, primarily for driving the load. Such operation is available by making motor 10 with fewer poles than motor 11. This does not prevent the use of motor 10 alone for high speed light load operation, should the occasion arise, using resistance 15 in its secondary for control purposes. If the use of both motors simultaneously for power output is an important consideration, they may have the same pole number and may be operated in parallel with resistance 15 used in the secondary of motor 10. This of course does not prevent the use of motor 10 with capacitance 14 for improving the starting conditions or the use of either motor alone for up-to-speed operations. The motors may have the same or different horsepower output ratings. Where motor 10 is to be used primarily for improving the starting conditions and power factor improvement during normal operation, reference to its horsepower output rating does not have much significance but in such case it will not ordinarily need to be as large as motor 11. However, there may be two or more such motors as 11 requiring power factor correction and the design of motor 10 and the value of the capacitance employed in its secondary will be made to correspond to the requirements.

Where it is desirable to use motor 10 for power purposes during up-to-speed operation of the drive, it is also feasible to use capacitance 14 for power factor correction of the motor drive by disconnecting it from the secondary of motor 10 and connecting to the source of supply to the motors. Usually the source of supply voltage will be higher than should be continuously connected directly across the capacitance 14 and usually such direct connection would give more power factor correction than is needed at normal operating speed. Hence, I provide for the connecting of capacitance 14 with the source of supply to the motors through a transformer by means of which some desired reduced effect of the capacitance is obtained. The stator winding 16 of motor 10 may be used as such transformer as represented, the capacitance being connected thereto through taps to points of less voltage than its line terminals.

Where the motors 10 and 11 are of the same pole number and the load to be driven becomes such that it may be driven by one or the other of the motors alone, the motor action not required may remain idle. Motor 10 may be used separately or simultaneously for motor action and for auto transformer action.

Switches have been shown on the drawing for making the various different connections mentioned. In any case where one or more of the connections described is not required, the apparatus not used may be omitted.

It is seen that the scheme of using the motor 10 with capacitance 14 for important improvements in the starting conditions allows of considerable latitude in the choice of equipment and the manner in which the chosen equipment can be used efficiently during normal running operations. In any case where self excitation, due to the use of capacitance in series relation with the secondary of the induction motor, becomes bothersome, stabilizing resistors may be used in shunt to the capacity as suggested in United States Patent 2,149,082.

What I claim as new and desire to secure by Letters Patent of the United States is:

1. An induction motor drive comprising a plurality of induction motors mechanically connected in driving relation, means for starting said motors simultaneously from a common source of supply, one of said motors having a wound secondary winding and a non-adjustable capacitance connected in series with such wound secondary winding of sufficient value as to cause the power factor of the total current supplied to such motors at the instant of starting to be substantially unity, the wound secondary motor serving as a variable frequency, variable voltage transformer to reduce the effective value of such capacitance as the motors increase in speed during starting of the motors.

2. A motor drive including a pair of induction motors mechanically connected in driving relation, a common source of alternating current supply for said motors, means for simultaneously connecting said motors to such source of supply for starting purposes, one of said motors having a wound secondary winding, and capacitance connected in series with said wound secondary winding for the purpose of correcting the power factor of the total current taken by both motors during starting, the pole number and mechanical driving relation between such motors being such that the motor having the capacitance in its secondary operates at a very much higher slip than the other motor during normal running conditions, whereby the effect of the capacitance is automatically reduced as the motors come up to the normal running speed and is available for power factor correction of the combination at such speed.

3. A motor drive including a pair of induction motors mechanically connected to run at the same speed, a common source of supply for said motors, means for energizing said motors simultaneously for starting purposes, one of said motors having a wound secondary winding and being of smaller size and having fewer poles than the other motor, and capacitance connected in series with the said wound secondary winding for the purpose of correcting the power factor of said motor drive combination at start and at the normal running speed of the larger motor.

4. A motor drive comprising a plurality of induction motors mechanically connected in driving relation, a common source of supply for said motors, means for connecting said motors to said source of supply simultaneously for starting purposes, one of said motors having a wound secondary winding, capacitance connected in said secondary winding, whereby the wound secondary winding motor serves as a variable frequency, variable voltage transformer between the source of supply and capacitance during the starting operation of the motors to improve the starting conditions of the combination and to reduce the effect of the capacitance as the motors increase in speed, resistance means, and connections for substituting said resistance means for the capacitance in the secondary circuit of the wound secondary motor after the starting operation.

5. A motor drive comprising a plurality of induction motors mechanically connected in driving relation, a common source of supply for said motors, means for connecting said motors to said source of supply simultaneously for starting purposes, one of said motors having a wound secondary winding, capacitance to be included in said secondary winding during starting of the motors to cause the wound secondary motor to serve as a variable frequency variable voltage transformer between the source of supply and the capacitance to improve the starting conditions of said drive and to reduce the effect of the capacitance as the motors increase in speed, resistance means and connections for substituting said resistance means for the capacitance in the secondary circuit of the wound secondary motor and for connecting the capacitance with the source of supply after the starting operation.

6. A motor drive comprising a plurality of induction motors mechanically connected in driving relation, a common source of supply for said motors, means for connecting said motors to said source of supply simultaneously for starting purposes, one of said motors having a wound secondary winding, capacitance, means for connecting said capacitance in the secondary of the wound secondary motor to cause said motor to serve as a variable voltage, variable frequency transformer between the source of supply and capacitance during the starting of said motors to improve the starting conditions, and to reduce the effect of such capacitance as the motors increase in speed, and means for disconnecting said capacitance from such secondary winding and connecting it with the source of supply at a reduced capacitance effect after the starting operation.

SELDEN B. CRARY.